United States Patent [19]
Leslie

[11] 4,411,005
[45] Oct. 18, 1983

[54] DATA CIRCUIT FOR FREQUENCY MODULATING AN OSCILLATOR

[75] Inventor: Samuel A. Leslie, Forest, Va.

[73] Assignee: General Electric Company, Lynchburg, Va.

[21] Appl. No.: 332,816

[22] Filed: Dec. 21, 1981

[51] Int. Cl.³ .............................................. H04B 15/06
[52] U.S. Cl. ..................................... 375/65; 331/1 R; 332/16 R
[58] Field of Search ................... 375/3, 45, 67, 68, 62, 375/64, 65; 455/618; 332/16 R; 328/138; 331/1 R

[56] References Cited

U.S. PATENT DOCUMENTS

| | | | |
|---|---|---|---|
| 4,153,814 | 5/1979 | Burgert | 375/67 |
| 4,163,944 | 8/1979 | Chambers et al. | 375/68 |
| 4,323,862 | 4/1982 | Boudault et al. | 375/62 |

*Primary Examiner*—Benedict V. Safourek
*Assistant Examiner*—Stephen Chin
*Attorney, Agent, or Firm*—James J. Williams

[57] ABSTRACT

Data signals which vary between first and second levels are applied to an operational amplifier by a timing signal produced in response to data signal transitions. The operational amplifier is connected to produce a nominal voltage in the absence of data signals, and to produce first and second voltages above and below the nominal voltage by equal amounts in response to the first and second data levels. The voltages so produced are used to control the frequency of an oscillator.

11 Claims, 3 Drawing Figures

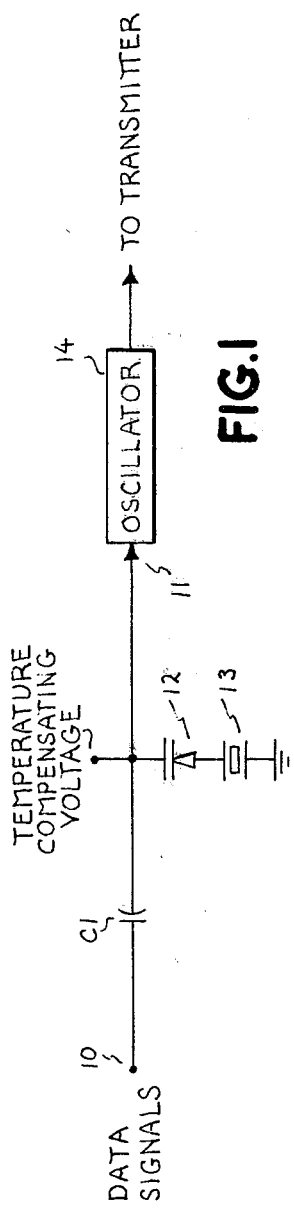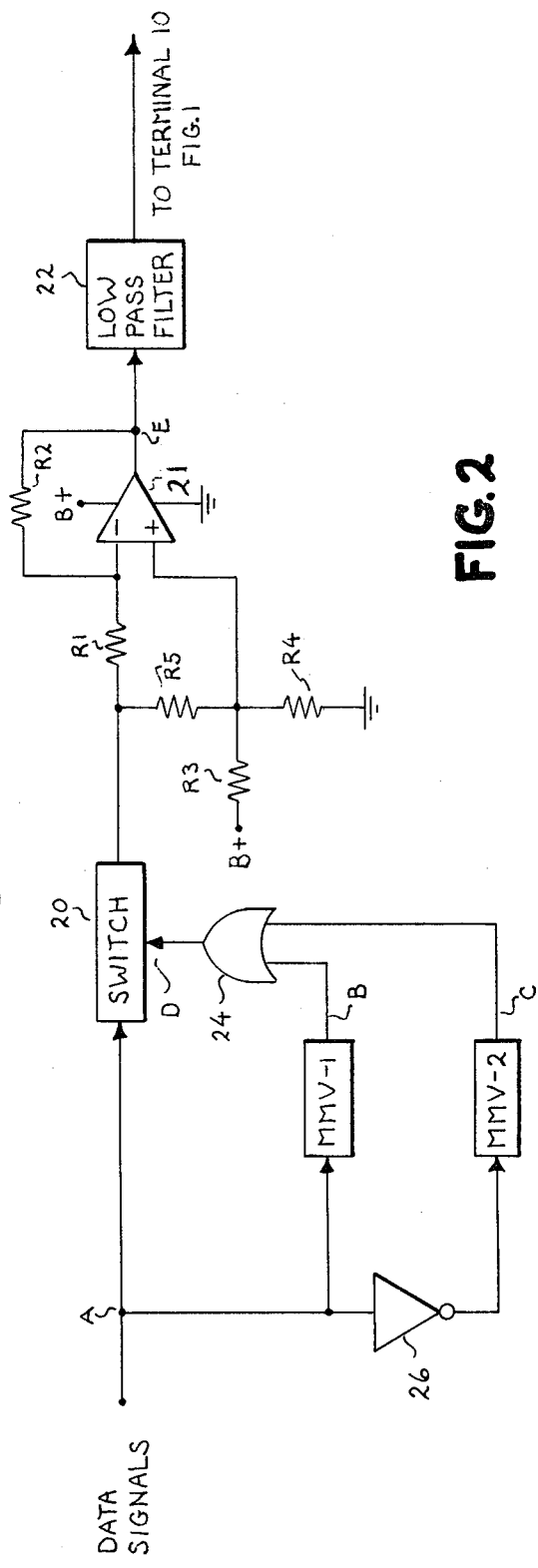

DATA CIRCUIT FOR FREQUENCY MODULATING AN OSCILLATOR

BACKGROUND OF THE INVENTION

My invention relates to an improved data circuit for frequency modulating (or frequency shift keying) an oscillator, and particularly to such a circuit that permits the data to be capacitively coupled to modulate an oscillator with little adverse effect on the oscillator performance or on the direct current frequency control circuit for the oscillator.

Binary data is frequently transmitted over a wire or radio channel by shifting an oscillator frequency between two frequencies, one of which may represent a binary 1 or mark, and the other of which may represent a binary 0 or space. Typically, the transmitter oscillator frequency is shifted by applying one of two direct current voltages to a voltage sensitive frequency determining element, such as a voltage sensitive capacitor diode (or varactor). A first voltage causes the varactor to have a capacity that provides a first oscillator frequency. A second voltage causes the varactor to have a capacity that provides a second oscillator frequency. In most oscillators, a temperature compensating direct current voltage is also applied to the varactor to maintain the oscillator frequency relatively constant over a temperature range. In such oscillators, the voltage representing data must be capacitively coupled to the varactor so that the direct current temperature compensating voltage will not be disturbed or changed by the applied data signal voltages. However, such a capacitor presents problems. If it is too large, its relatively long time constant increases the time needed for the frequency transitions to reach equal steady state values or magnitudes. This delay can cause transmissions outside the allocated frequency channel. In addition, it may be desirable or necessary that the frequency of the carrier without applied data be returned to a center frequency midway between the frequency transistions representing data. The time constant of the coupling capacitor causes a delay in this return. If the capacitor is too small its relatively short time constant produces a differentiating effect which prevents clean and sharp frequency transitions of the oscillator. Various circuits and an optimum time constant have been tried, but as far as I am aware, none has produced a result that is as desirable as needed.

SUMMARY OF THE INVENTION

Briefly, I provide an improved circuit for data that must be capacitively coupled to the frequency determining element of an oscillator. Data of almost any voltage levels is supplied to a switch which, when closed, connects the data to an amplifier. The switch is normally open in the absence of data, and is closed for a predetermined time in response to each data transition. In the absence of data when the switch is open, the amplifier produces a middle direct current output voltage substantially half-way between the peak to peak swings of the applied data signals. The amplifier output is coupled to the varactor by a capacitor with a fairly long time constant. In the presence of data when the switch is closed, the amplifier output varies equally about its middle direct current voltage. These variations are effectively coupled by the large capacitor to the varactor so that good frequency modulation of the oscillator is provided, and so that the oscillator frequency deviations from the center frequency are substantially equal.

BRIEF DESCRIPTION OF THE DRAWING

The subject matter which I regard as my invention is particularly pointed out and distinctly claimed in the claims. The structure and operation of my invention, as well as advantages, may be better understood from the following description given in connection with the accompanying drawing, in which:

FIG. 1 shows an oscillator circuit for which my invention is intended;

FIG. 2 shows a schematic diagram of a preferred circuit in accordance with my invention.

DESCRIPTION OF THE PREFERRED EMBODIMENT

Figure 3:
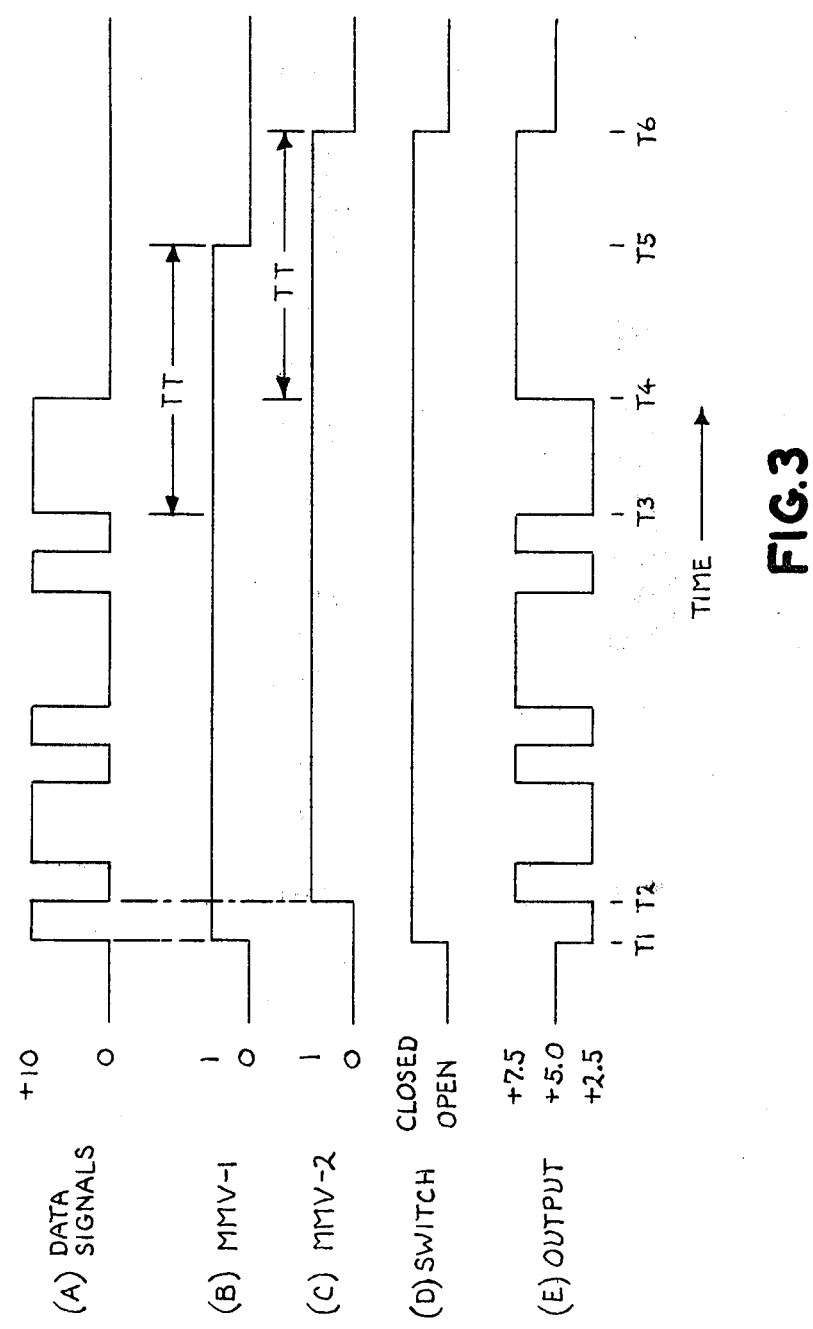
FIG. 3 shows wave forms A through E for illustrating the operation of my circuit of FIG. 2.

With reference to FIG. 1, I show in block form an oscillator 14 for which my invention is intended. This oscillator 14 may take a number of different circuit configurations, depending on preference and application. Typically, such an oscillator is provided with a frequency determining crystal 13, and if required, a voltage variable capacitor diode (or varactor) 12 connected to an input terminal 11. The varactor 12 and the crystal 13 are connected to the terminal 11 in proper frequency determining relation. A direct current compensating voltage that varies with temperature is connected to the varactor 12. This compensating voltage changes the capacity of the varactor 12 with temperature so as to maintain the frequency of the oscillator 14 relatively stable over a selected temperature range. Data signals are applied to an input terminal 10 for the purpose of causing the oscillator 14 to shift between frequencies representative of the data. Typically, the data signals are in binary form represented by two levels of direct current voltage. When a binary logic 1 data signal is present, the oscillator frequency should be shifted to a frequency F1. When a binary logic 0 data signal is present, the oscillator frequency should be shifted to a frequency F2. Where the data signals are represented by direct current voltages (for example 0 volt for a logic 0 and plus 10 volts for a logic 1) these voltages should not intefere with or modify the temperature compensating voltage. To prevent this, the data signals at the terminal 10 are capacitively coupled by a capacitor C1 to the oscillator terminal 11. This capacitor C1 has, in prior art circuits of which I am aware, introduced problems. If the capacitor C1 is relatively small, it differentiates the data signals, and distorts or prevents good frequency signals from being transmitted. If the capacitor C1 is too large, its relatively long charge time causes a correspondingly long period of time in order for the frequency transitions of the oscillator 14 to reach equal values or magnitudes. This can cause the oscillator 14 to produce frequencies outside of the desired or allocated frequency band.

FIG. 2 shows a schematic diagram of a preferred circuit in accordance with my invention for data signals which must be applied to an oscillator through a direct current isolating capacitor. The binary data signals may vary between any desired or reasonable direct current voltages. These signals are applied to an input terminal A. The terminal A is connected to a switch 20 which is normally open, but which is closed in response to an appropriate binary signal of logic 1 at its control terminal D. The output of the switch 20 is applied through a resistor R1 to the negative (−) input terminal of an operational amplifier 21. The amplifier 21 is provided with a suitable direct current supply voltage as indicated. The output E of the amplifier 21 is fed back in typical fashion by a resistor R2 to the negative input with the ratio of resistors R1 and R2 establishing the gain of the circuit. A reference voltage equal to one half of the input voltage swing at A is applied to the positive (+) input terminal of the amplifier 21 by a suitable source of direct current voltage B+ and a voltage divider comprised of resistors R3, R4. The output E of the amplifier 21 may be applied to a low pass filter 22. The output from the filter 22 is applied to the terminal 10 of FIG. 1.

Control signals for application to the control input D are provided by two retriggerable monostable (or one shot) multivibrators MMV-1, MMV-2. The trigger input for the multivibrator MMV-1 is coupled directly to the input terminal A, and the trigger input for the multivibrator MMV-2 is coupled through a logic inverter 26 to the input terminal A. In their normal or quiet state, the multivibrators MMV-1, MMV-2 produce a logic 0 at their respective outputs B, C. The multivibrator MMV-1 produces a timed logic 1 at its output B in response to each positive-going transistion at the terminal A, and the multivibrator MMV-2 produces a timed logic 1 at its output C in response to each negative-going transition at the input terminal A. The logic 1's produced by each of the multivibrators MMV-1, MMV-2 have equal time durations or trigger times TT. Since the multivibrators MMV-1, MMV-2 are retriggerable, each data transition starts their respective trigger times TT over again. The outputs B, C are applied to the two inputs of an OR gate 24. The output of the gate 24 is coupled to the control input D of the switch 20.

Operation of my circuit of FIG. 2 is explained in connection with the wave forms of FIG. 3 which are plotted along a common time axis. The designations A through E at the left of the wave forms represent the signals or voltages present at the correspondingly designated locations in FIG. 2. In wave form A, I show input data signals which, for purposes of explanation, I have assumed vary between 0 and +10 volts with respect to time. Other voltages are possible. At the time T1, the rising or positive transition of the data signal causes the multivibrator MMV-1 to produce a logic 1 at its output B. Similarly, at the time T2, the falling or negative transition of the data signal causes the multivibrator MMV-2 to produce to a logic 1 at its output C. Each respective transition retriggers the multivibrators MMV-1, MMV-2 for its trigger time TT. The switch 20 is closed at the time T1 as shown in wave form D.

The amplifier 21 is, for the assumed data voltages of 0 and +10 and a gain of one half for example, arranged to produce an output of +5 volts when the switch 20 is open and as shown in FIG. 3E prior to the time T1. When the switch 20 closes, and a +10 volt data signal is applied, this causes the amplifier output E to switch to +2.5 volts, since the operational amplifier 21 produces an output that is the inverse of one-half the 10 volt input level with respect to the five-volt reference level. At the time T2, the return of the data signal to 0 volt causes the output E to switch to +7.5 volts, which again is the inverse of one-half the zero level with respect to the five-volt reference level. The changes in the output E thus vary between +2.5 and +7.5 volts for the changes in the input data signals A between +10 volts and 0.

At the time T3, I assume that the last positive transition of the data signals occurs. This starts the last trigger time TT for the multivibrator MMV-1 which ends at the time T5. Likewise, I assume that the last negative transition of the data signals occurs at the time T4 which starts the trigger time TT for the multivibrator MMV-2 that ends at the time T6. When the last multivibrator (in this case the multivibrator MMV-2) times out at the time T6, the switch 20 is opened again. This causes the amplifier 21 to produce an output E of +5 volts which, it will be noted, is midway between the variations of +2.5 and +7.5 volts. The nominal or middle temperature compensating voltage at terminal 11 can be any voltage (for example, 6.75 volts); the capacitor C1 does not need to charge or discharge when data starts or stops, since the capacitor C1 is already at its average steady state charge between its input and output values (in this example, 1.75 volts). Thus, the oscillator 14 produces its center frequency almost at once. In addition it will be noted that the variations about the oscillator center voltage (for example, 6.75 volts) are equal, that is from +6.75 volts to +4.25 volts and from +6.75 volts to +9.25 volts. Thus equal frequency swings of the oscillator 14 about its center frequency are provided, despite relatively large or variable swings in the data signals and/or variations in the oscillator compensating voltage. This produces or provides vastly improved frequency transmissions, a very desirable result in the radio spectrum.

Persons skilled in the art will appreciate the modifications that may be made to my circuit of FIG. 2. The low pass filter 22 may be omitted, but I prefer its use because it provides an effective means for reducing unwanted spectral components outside the allocated frequency channel. And, of course the various voltages and gains to be supplied by the amplifier 21 may be selected to fill particular needs. Likewise, the timing periods TT for the multivibrators MMV-1, MMV-2 may be varied. However, I prefer that the timing period TT be at least as long as the longest steady state logic level to be expected in a given transmission. And, I prefer that the time constant of the capacitor C1, with whatever resistance it operates with in the circuit of FIG. 1, be considerably longer than the trigger time TT, preferably as much as ten times as long. This long time is desired to prevent undue distortion to the data waveform which may arise due to a long series of logic 1's or 0's which may appear at the input to the circuit. A resistor R5 may be provided as shown in FIG. 2 to take care of circuit imperfections in the switch 20 and the amplifier 21. If the switch 20 has infinite impedance when it is open and if the amplifier 21 has zero offset current, then resistor R5 would not be needed. The resistor R5 is thus provided to provide a relatively low impedance source of +5 volts reference signal to the minus input of the amplifier 21 to insure that its output remains at +5 volts when the switch 20 is open.

It will thus be seen that I have provided a new and improved circuit for data which is to be applied to frequency modulate a transmitter, particularly a transmitter for radio signals. While my invention has been described in reference to a particular embodiment, it is to be understood that modifications may be made without departing from the spirit of the invention or from the scope of the claims.

What I claim as new and desire to secure by Letters Patent of the United States is:

1. An improved circuit for modifying data signals which vary between two voltage levels for application to an oscillator modulation circuit comprising:
   a. a data input for said data signals;
   b. first means coupled to said data input for producing a first time signal in response to transitions of said data signals in a first direction;
   c. second means coupled to said data input for producing a second time signal in response to transitions of said data signals in a second direction opposite said first direction;
   d. switching means having an input coupled to said data input, having an output, and having a control input for selectively applying signals present at said data input to said output in response to signals applied to said control input;
   e. third means coupling said control input to said first and second means for blocking data signals from said output in response to the absence of both of said first and second time signals and for passing data signals to said output in response to the presence of either of said first and second time signals;
   f. and fourth means coupled to said output of said switching means for producing a predetermined reference voltage in the absence of data signals and for producing substantially equal and opposite deviations from said reference voltage in response to said two voltage levels respectively.

2. The improved circuit of claim 1 wherein said first and second time signals are produced in response to each data signal transition respectively.

3. The improved circuit of claim 1 or claim 2 wherein said first and second time signals are substantially equal and are at least as great as the time duration of a data signal at one continuous voltage level.

4. The improved circuit of claim 1 or claim 2 wherein said fourth means comprise an operational amplifier.

5. The improved circuit of claim 3 wherein said fourth means comprise an operational amplifier.

6. A data input circuit for modulating the frequency of an oscillator requiring a nominal direct current control voltage, said circuit comprising:
   a. an input for said data;
   b. switching means coupled to said input for passing said data in response to a timing signal;
   c. timing means coupled to said input and to said switching means for producing a timing signal of selected time duration in response to each transition of said data;
   d. an operational amplifier arrangement having a reference input and a data input, said operational amplifier arrangement producing a selected nominal output voltage in response to the absence of data at said data input, producing a first selected output voltage in response to data of a first magnitude, and producing a second selected output voltage in response to data of a second magnitude;
   e. means for applying a reference voltage to said reference input;
   f. and means coupling said switching means to said data input of said operational amplifier arrangement for supplying data to said data input in response to said switching means passing said data.

7. The data input circuit of claim 6 wherein said first selected output voltage is higher than said selected nominal output voltage by a first magnitude, and wherein said second selected output voltage is lower than said selected nominal voltage by a second magnitude substantially the same as said first magnitude.

8. The data input circuit of claim 6 or claim 7 wherein said timing signal has a time duration at least as long as the time of continuous data at one level.

9. The data input circuit of claim 6 or claim 7 wherein said nominal output voltage is substantially equal to the nominal direct current control voltage for said oscillator.

10. The data circuit of claim 8 wherein said nominal output voltage is substantially equal to the nominal direct current control voltage of said oscillator.

11. A method of modifying binary input data for applying the data to direct current input of a voltage-controlled oscillator, comprising the steps of:
    a. sensing rising and falling transitions of said input data and producing a predetermined timing signal in response to each of said sensed transitions;
    b. passing said input data to one input of an operational amplifier arranged to produce a predetermined direct current voltage in the absence of passed input data;
    c. and causing said operational amplifier to produce a first direct current voltage higher, by a first predetermined magnitude, than said predetermined voltage in response to a first input data magnitude, and to produce a second direct current voltage lower, by said first predetermined magnitude, than said predetermined voltage in response to a second data input magnitude.

* * * * *